(12) United States Patent
Anthony et al.

(10) Patent No.: US 7,605,947 B2
(45) Date of Patent: Oct. 20, 2009

(54) MAKING ELECTRONIC INK UNIVERSALLY LEGIBLE

(75) Inventors: Colin R. Anthony, Bothell, WA (US); Daniel W. Crevier, Bellevue, WA (US); Jeffrey J. Weir, Seattle, WA (US); Sam J. George, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 11/362,712

(22) Filed: Feb. 28, 2006

(65) Prior Publication Data

US 2007/0201057 A1   Aug. 30, 2007

(51) Int. Cl.
 *G06F 15/00* (2006.01)
(52) U.S. Cl. ........................... 358/1.9; 358/3.27
(58) Field of Classification Search .................. 358/1.1, 358/1.9, 3.27, 1.11, 1.14, 1.15, 1.18
See application file for complete search history.

(56) References Cited

U.S. PATENT DOCUMENTS 6,169,607 B1 * 1/2001 Harrington .................. 358/1.9
7,110,147 B1 * 9/2006 Hayama et al. ............. 358/464

FOREIGN PATENT DOCUMENTS

JP                08300638 A   *  11/1996

* cited by examiner

*Primary Examiner*—Thomas D Lee
(74) *Attorney, Agent, or Firm*—Lee & Hayes, PLLC

(57) ABSTRACT

Enhancement of electronic ink is achieved by automatically displaying a contrasting outline for the ink. The outline provides a visual transition between the ink and the underlying background. The outlining color may be chosen independent of the background color(s). Thus, a user may choose any ink color desired, without regard to the background, and the written ink will be legible over the background. Moreover, the user does not need to change ink color based on the background, but instead may maintain the same ink color over the entire background if the user so desires.

20 Claims, 8 Drawing Sheets

MAKING ELECTRONIC INK UNIVERSALLY LEGIBLE

BACKGROUND

Drawing programs and electronic inking on computer systems are well known today. For example, tablet-style computers often allow a user to "write" on a touch-sensitive display with a stylus, and in response electronic ink is displayed where the user has written. Users may also write ink using a mouse or other input device suitable for a graphical user interface.

In some situations, the user may want to write electronic ink over a displayed background, such as a photograph or a graphical element. In these situations, before starting writing, the user must choose an ink color that is most likely to be reasonably legible in the portion of the photo or other background that the user intends to write on. The user may even need to make this color decision multiple times where the background has different areas with different color profiles. This is quite inconvenient and time consuming, and results in a poor user experience.

SUMMARY

Aspects of the present disclosure describe provide for enhancement of electronic ink by automatically providing an outline for the ink. The outline provides a visual contrasting transition between the ink and the background. Use of such outlining features may be convenient to the user because the outline color and/or other aspects of the outlining may be automatically chosen based on the ink color. In addition, the outlining color may be chosen independent of the background color(s). Thus, a user may now choose any ink color desired, without regard to the background, and know that the written ink will be legible over the background. Moreover, the user will not have to change ink color based on the background, but instead may maintain the same ink color over the entire background if the user so desires.

Further aspects of the present disclosure provide details for implementing outlining, including choosing outlining colors, outlining opacities, outlining thicknesses, and the graphical layering of the ink, the outline(s), and the background.

These and other aspects of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Illustrative Computing Environment

Figure 1:
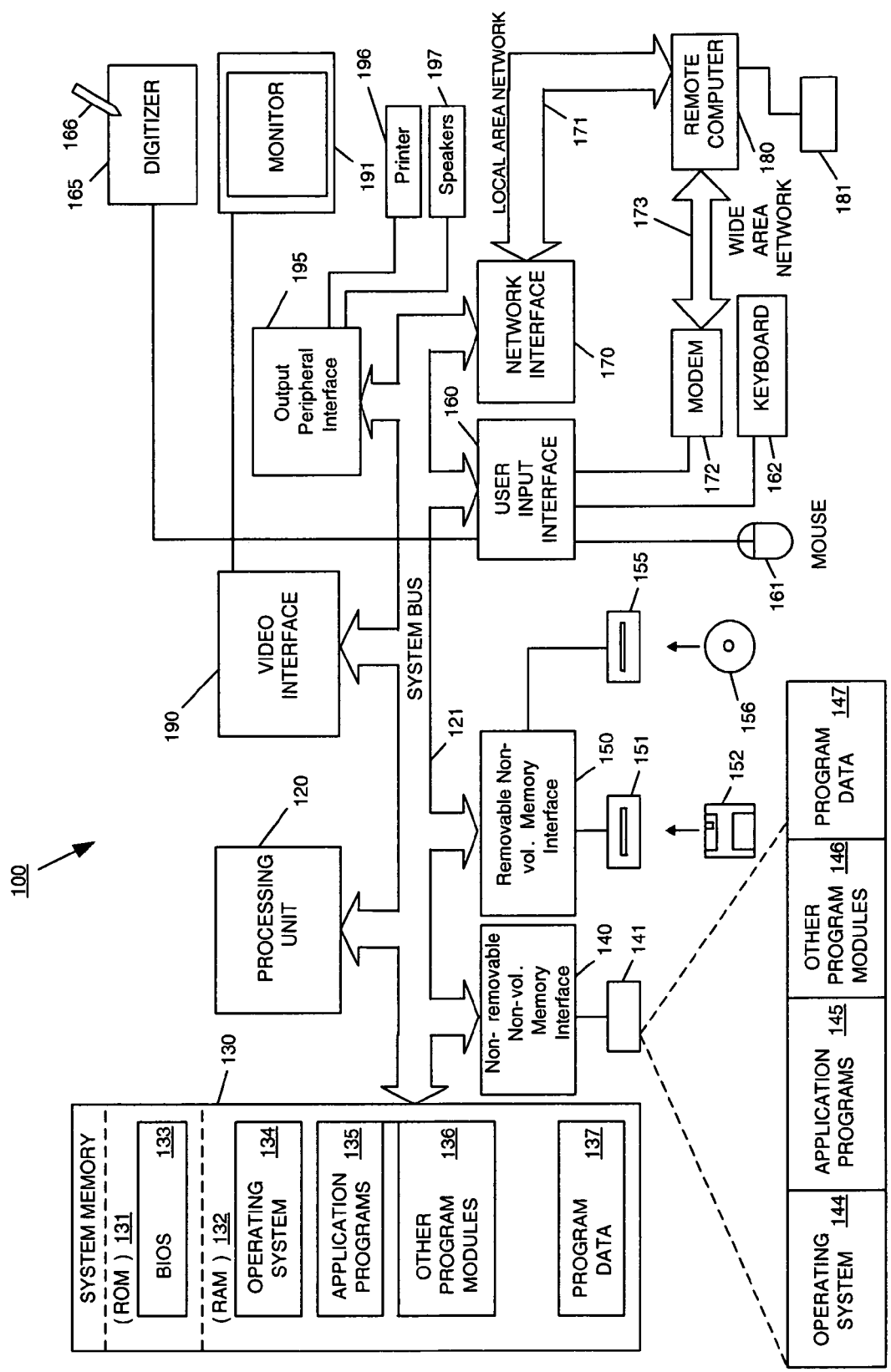
FIG. 1 is a functional block diagram of an illustrative computing environment.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer-readable media and communication media. Computer-readable media are tangible media, and may include volatile, nonvolatile, removable, and non-removable media implemented in any method or technology for storage of information such as computer-readable instructions, data structures, program modules or other data. For example, computer-readable media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices. enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet computer. For example, computer 100 may be configured as a tablet computer or a handheld device such as a PDA where touch-sensitive device 165 would be considered the main user interface. In such a configuration touch-sensitive device 165 may be considered to include computer 100. Tablet computers are well-known. Tablet computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Figure 2:
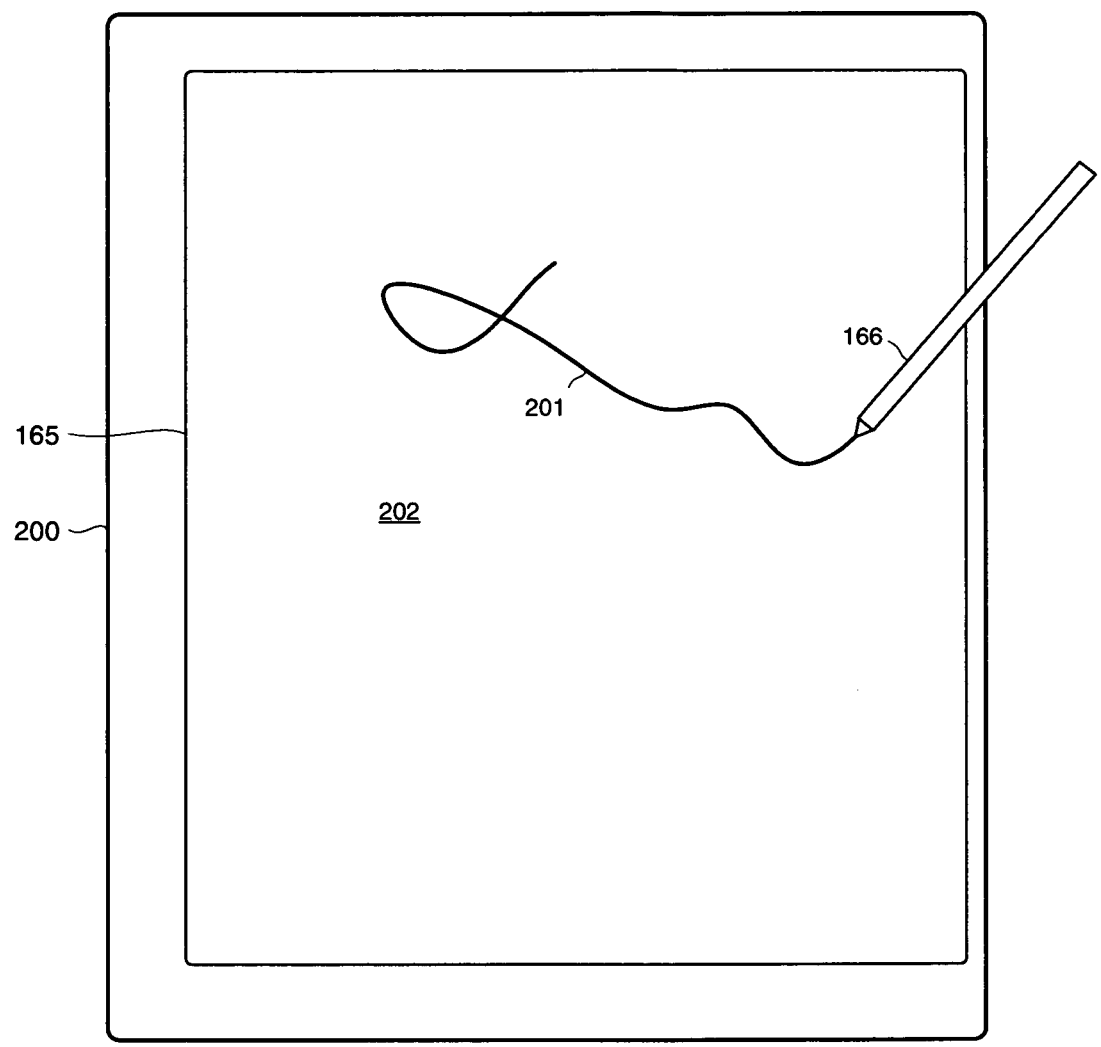
FIG. 2 is a plan view of an illustrative tablet computer that may embody or be a part of the computing environment of FIG. 1.

Referring to FIG. 2, some or all of computer 100 may be embodied as a tablet computer 200 as shown. Here, tablet computer 200 includes touch-sensitive device 165 (which in this example is a touch-sensitive screen) and stylus 166. In response to the user moving stylus 166 along touch-sensitive screen 165, tablet computer 200 may cause electronic ink 201 to be displayed on touch-sensitive screen 165, following the movement of stylus 166.

As will be described below, electronic ink 201 may be drawn in various colors and thicknesses as a foreground object layered over a background 202. Traditionally, where the ink color and the background color are the same or similar, the ink is difficult to see. However, as described below, displaying an outlining of the ink may allow the ink to be more visible to the user even over backgrounds that are of the same or similar color as the foreground ink. It is noted that, although various ink outlining features are discussed herein as being displayed on or otherwise used with touch-sensitive screens, these features may also be displayed on or otherwise used with any other type of display, such as a conventional non-touch-sensitive display.

Ink Without Outlining

Figure 3:
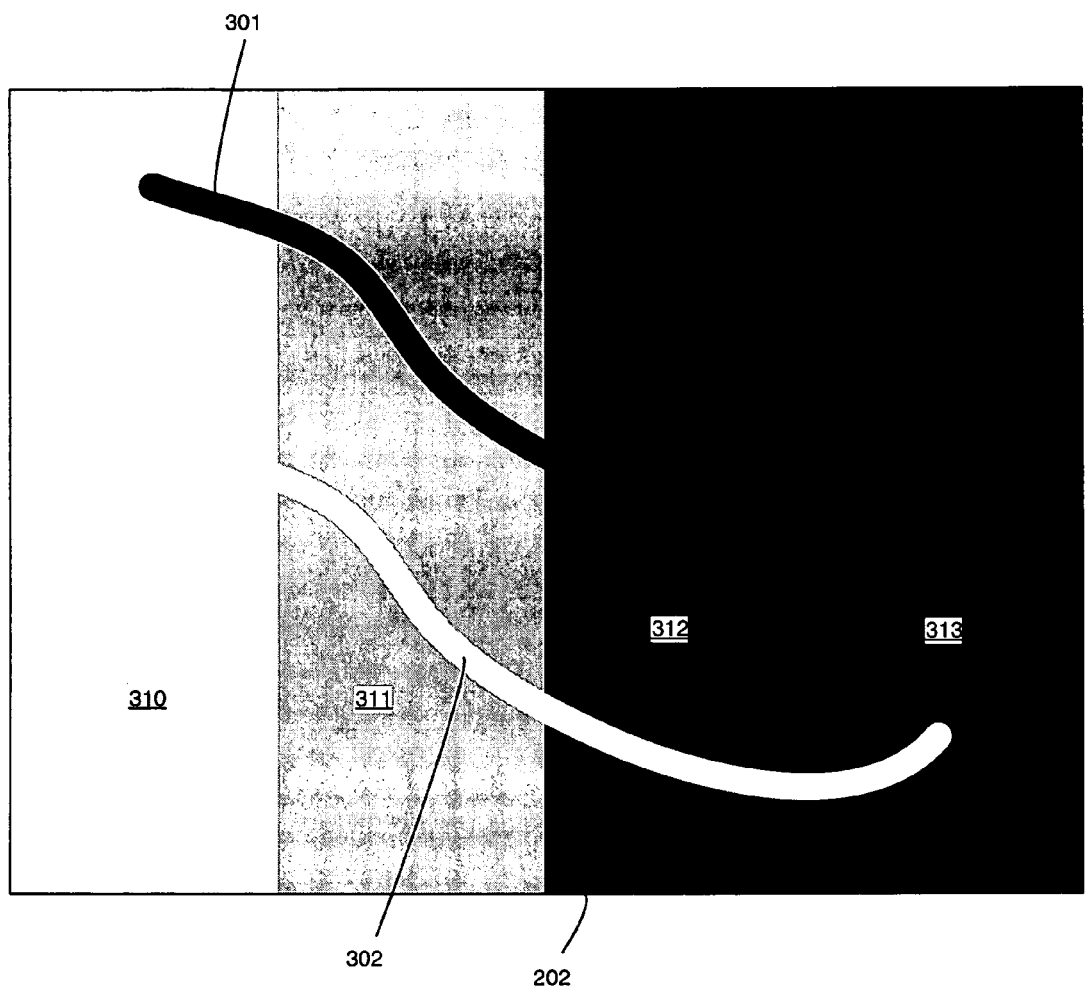
FIG. 3 is an illustrative screenshot of ink drawn over a background.

FIG. 3 shows an example screenshot of what may be displayed on touch-sensitive screen 165. As shown, background 202 includes four portions 310, 311, 312, 313, each having a different visual characteristic. In this example, background portion 310 is white, background portion 311 is light grey, background portion 312 is dark grey, and background portion 313 is black. Although black/white shades are referred to in this example, it is noted that portions 310-313 may be of different colors, such as red, white, blue, and green, respectively. Also, background 202 in this example is relatively simple (it has four vertical stripes) for ease of explanation. However, background 202 may alternatively be a more complex static or dynamic background such as a photograph, drawing, movie, text, or rendered web page.

FIG. 3 also shows two ink strokes 301, 302 drawn by the user using stylus 166, each extending over all four background portions 310-313. In this case, the user has selected ink stroke 301 to be a black ink stroke and ink stroke 302 to be a white ink stroke. In this example, no outlining of ink strokes 301, 302 is provided. The result is that it may be difficult if not impossible for the user to see portions of ink strokes 301, 302 over background 202. In particular, black ink stroke 301 is difficult to see over dark grey background portion 312 and impossible to see over black background portion 313. Likewise, white ink stroke 302 is difficult to see over light grey background portion 311 and impossible to see over white background portion 310. It will be apparent to the reader that such problems may also occur where other colors are involved, such as a red ink stroke rendered over a red or pink background. The term color as used herein includes all aspects of color in a given color space—for instance, hue, saturation, and brightness. Thus, for example, while blue versus red are different colors, as are dark blue versus light blue, as well as white versus grey versus black.

Outlining of Ink

Figure 4:
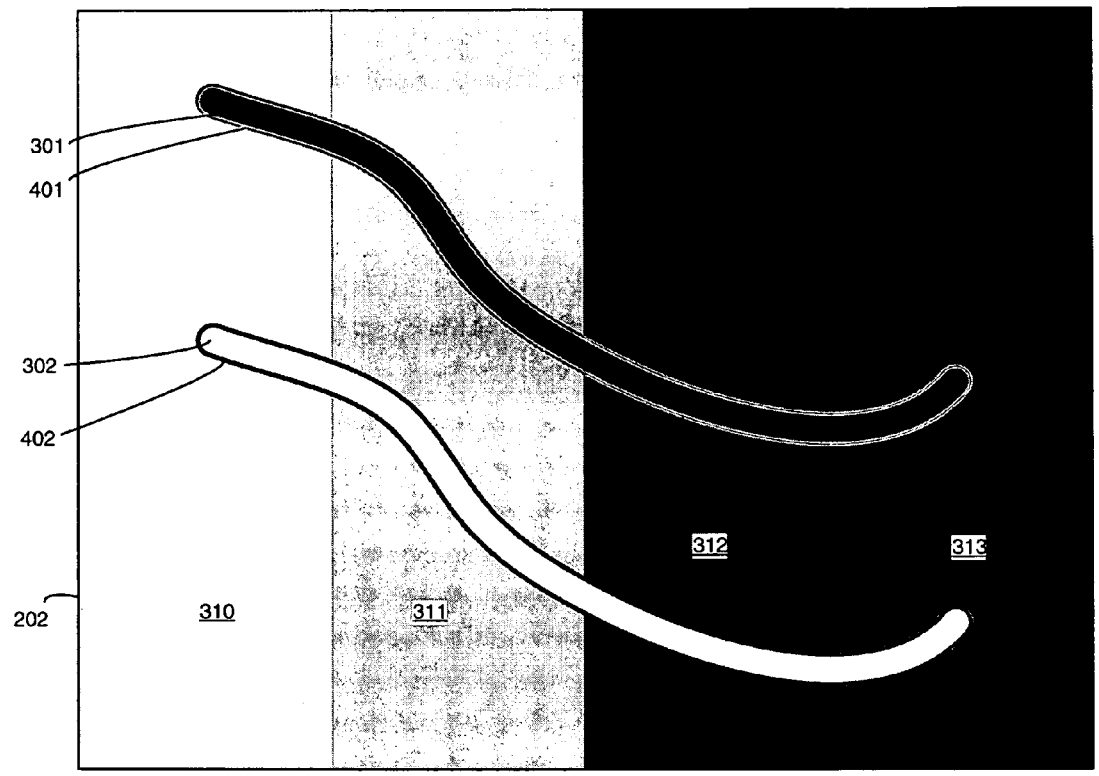
FIG. 4 is an illustrative screenshot of ink drawn over a background, wherein an outline is displayed around the ink.

In contrast, FIG. 4 shows the same ink strokes 301, 302, but now also enhanced with an outline 401, 402 for each ink stroke 301, 302. Outlines 401, 402 are displayed so as to appear to the user to be immediately adjacent to and surround, or substantially surround, their corresponding ink strokes 301, 302. Outline 401 is of a color different than the color of corresponding ink stroke 301, and outline 402 is of a color different than the color of corresponding ink stroke 302. For example, as shown, outline 401 is light grey while ink stroke 301 is black, and outline 402 is dark grey while ink stroke 302 is white. Again, other colors may be used. In addition to an outline being of a different color than its corresponding ink stroke, the color of the outline may depend upon the color if its corresponding ink stroke. For instance, a lighter colored ink stroke (such as light grey) may have a darker colored outline (such as dark grey or black), and a darker colored ink stroke (such as dark grey) may have a lighter colored outline (such as light grey or white). The color of the outline may be determined regardless of the color of the background, or the color of the outline may additionally depend upon the color of the background.

As can be seen, ink strokes 301, 302 are substantially more visible to the user in FIG. 4 than in FIG. 3. This is because outlines 401, 402 provide a visually contrasting transition zone between ink strokes 301, 302 and background 202.

Figure 5:
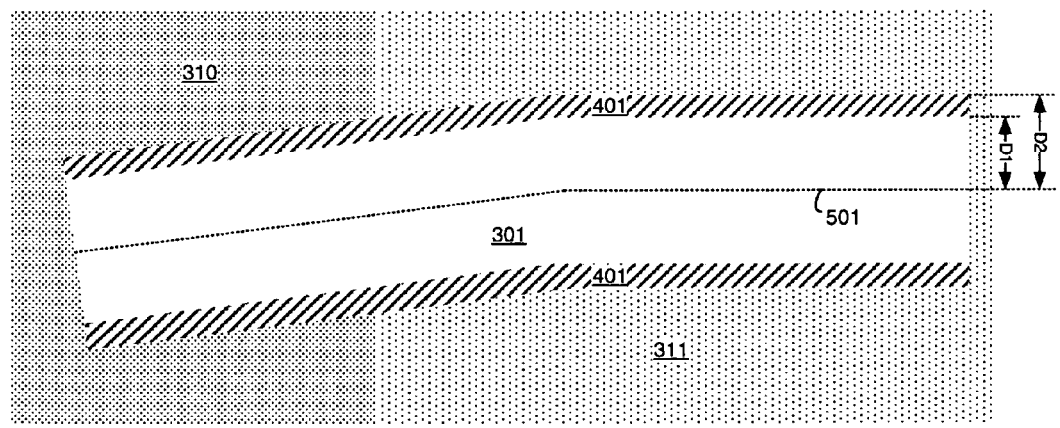
FIG. 5 is a representation of a portion of the screenshot of FIG. 4.

FIG. 5 illustrates the anatomy of ink stroke 301 and outline 401. Here, a portion of ink stroke 301 is shown, with outline 401 surrounding ink stroke 301 such that it extends away from ink stroke 301 on opposing sides. An imaginary axis 501, shown in FIG. 5 for explanatory purposes only, represents the vectors of ink stroke 301 independent of ink stroke width. At any given portion of ink stroke 301, ink stroke 301 has a width such that it extends a distance D1 from, and in a direction normal to, axis 501. Thus, ink stroke 301 has a width equal to 2*D1. Also, at any given portion, outline 401 extends a distance D2 from, and in a direction normal to, axis 501. Thus, outline 401 may be considered to have a width equal to 2*D2. Distance D2 is greater than distance D1 so that outline 401 will be visible to the user. In addition, at any given point, outline 401 may extend beyond the edge of ink stroke 301 by a distance smaller than the width of ink stroke 301, in a direction normal to ink stroke 301. In other words, D2 may be less than 2*D1. In this example, outline 401 has the same overall shape as ink stroke 301, except that outline 401 is wider than ink stroke 301.

Outline 401 may have a particular color and opacity, which may affect how smooth and natural the edge of the ink stroke appears relative to the background. An outline having an opacity of 100% means that the outline is completely opaque (i.e., not transparent at all). An outline having an opacity of 60%, for example, means that the outline is 60% opaque (i.e., having a 40% transparency). When an outline has an opacity of less than 100%, this means that at least some of the background and/or other layer behind the outline is displayed and visible to the user. In one illustrative embodiment, outline 401 may have an opacity of approximately 50%, or in the range of 40% to 60%.

Figure 6:
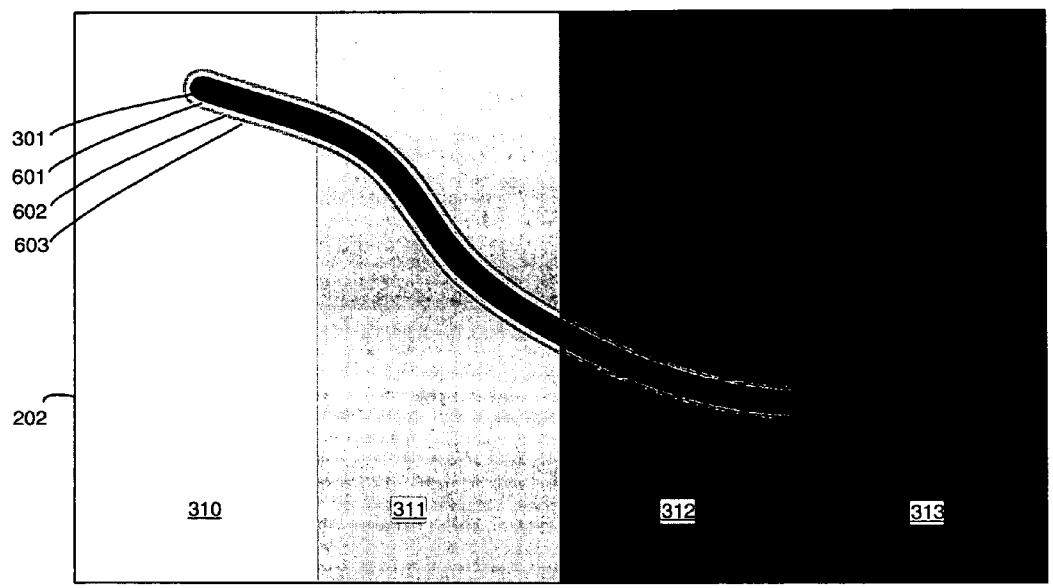
FIG. 6 is an illustrative screenshot of ink drawn over a background, wherein multiple outlines are displayed around the ink.
Figure 7:
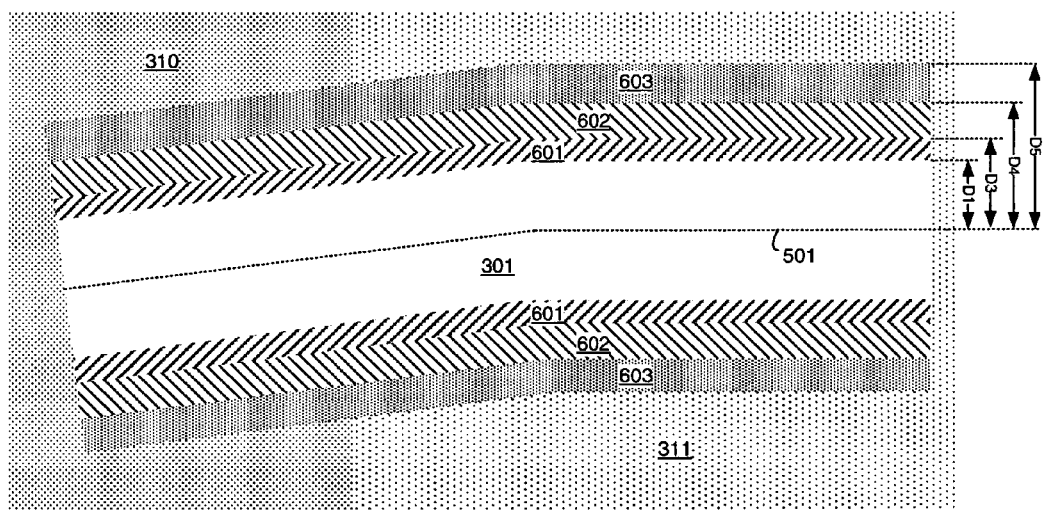
FIG. 7 is a representation of a portion of the screenshot of FIG. 6.

FIGS. 4-5 illustrate an example where a single outline is provided for an ink stroke. As illustrated by FIG. 6, a plurality of different outlines may be simultaneously displayed for the same ink stroke. For example, ink stroke 301 is shown here to have three different outlines 601, 602, 603, each having successively greater widths. As shown in FIG. 7, outline 601 has a width equal to 2*D3, outline 602 has a width equal to 2*D4, and outline 603 has a width equal to 2*D5, wherein D5>D4>D3>D1. In one illustrative embodiment, D1=4, D3=6, D4=10, and D5=14 (arbitrary linear units, such as pixels). The width of each outline may depend upon the width of the ink stroke. For example, the wider the ink stroke, the wider the outline. In addition, the distance that the outline extends from the nearest edge of the ink stroke (in this example, D2−D1) may be fixed or it may depend upon the width of the ink stroke. For example, D2−D1 may be fixed, or D2−D1 may increase as D1 increases.

By using multiple outlines for a given ink stroke, the edges of the ink stroke relative to the background may be made to appear even more smooth and natural to the user, depending upon the choice of colors and/or opacities of the various outlines. Each outline 601, 602, 603 may also have different or the same opacities. In one illustrative embodiment, outline 601 has a higher opacity than outline 602, which in turn has a higher opacity than outline 603. This can provide a quite natural blending with the underlying background that is not harsh to the eye. In addition, the various outlines 601, 602, 603 may have different or the same colors that may or may not depend upon the color of ink stroke 301. In one illustrative embodiment that works well where ink stroke 301 has a hexadecimal-value color of 0×101010, or, using standard web page color terminology, #101010, (which is a dark gray) outline 601 has an RGB (red-green-blue) hexadecimal-value color of 0×FFFFFF, or using web page color terminology, #FFFFFF, (i.e., white) with an opacity of 20%, outline 602 is also white with an opacity of 7%, and outline 603 is also white with an opacity of 5%. Where ink stroke 301 is white in color, outlines 601, 602, 603 may, for example, have the same opacities but may instead be black in color. Although outlines 601, 602, 603 have a common color in both of these examples, they may have different colors from one another.

Ink Outlining Using Graphical Layering

Figure 8:
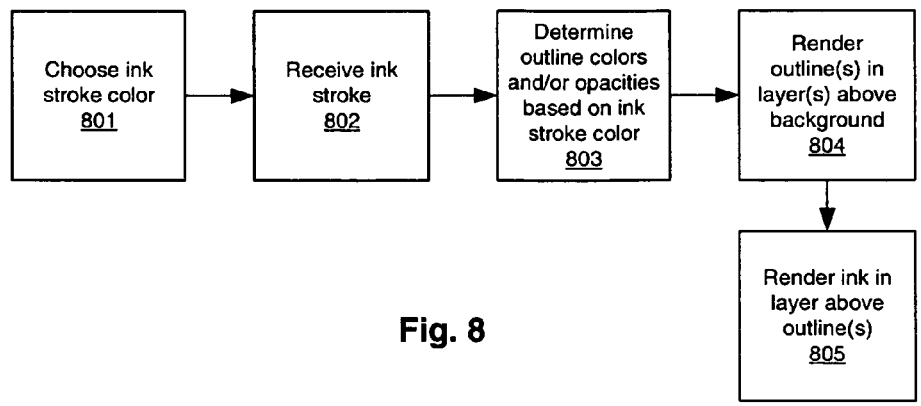
FIG. 8 is a flow chart showing illustrative steps that may be taken to render outlined ink.

FIG. 8 provides an overview of an illustrative process for rendering ink with ink outlines using graphical layering. The user and/or software chooses the color in which ink is to be drawn (step 801). For example, the user may decide that ink is to be drawn as black ink. Then, the user draws an ink stroke in the chosen ink stroke color, which is received by computer 100 (step 802). In response, computer 100 may determine one or more outline colors and/or opacities based on the ink stroke color (step 983), in this case black, and render one or more outlines (step 804). Each of the outlines may be rendered in its own separate graphical layer above the background. In addition, the received ink stroke may be rendered in a separate graphical layer above all of the outline graphical layers (step 805). Variations on the steps of FIG. 8 are envisioned. For instance, the user may choose or modify the ink stroke color after the ink stroke is drawn.

Figure 9:
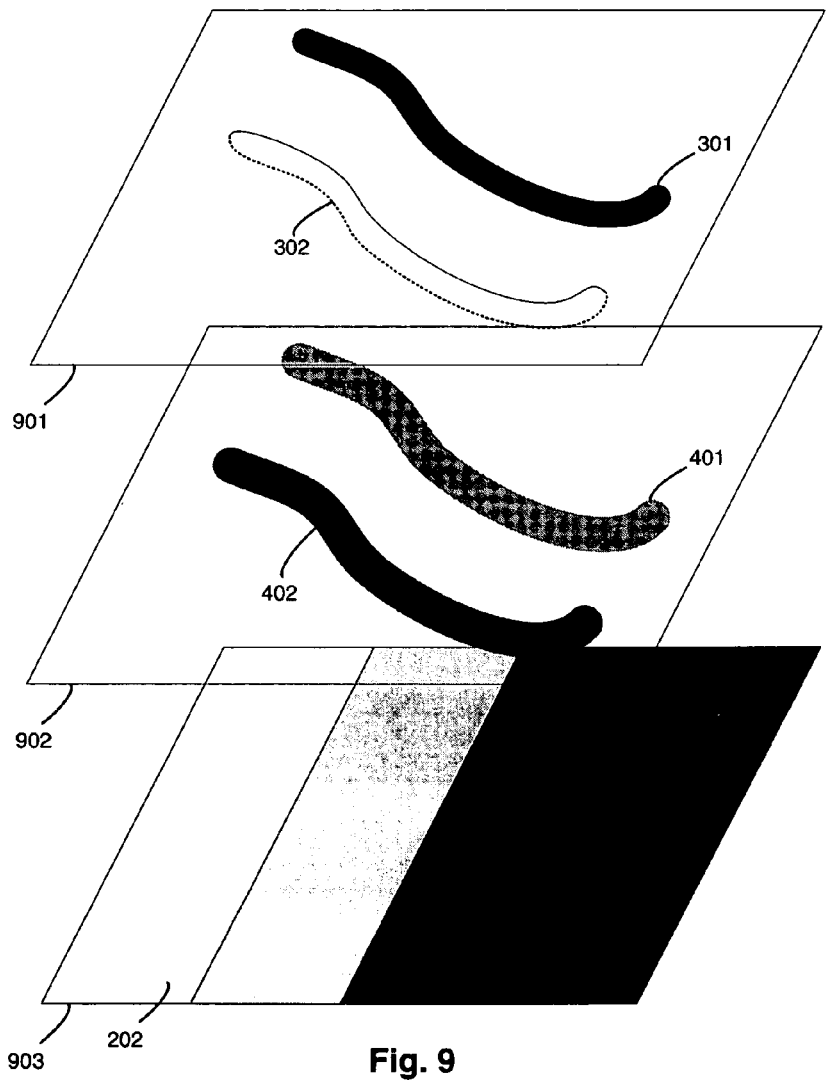
FIG. 9 is a representation of illustrative layering that may be used to display ink and ink outlining.

With reference to layering of outlines and the ink stroke. FIG. 9 shows an example of how ink strokes 301 and 302 are in a first graphical layer 901, outlines 401 and 402 are in a separate second graphical layer 902 underneath first graphical layer 901, and background 202 is in a third graphical layer 903 underneath first and second graphical layers 901 and 902. It is noted that ink stroke 302 is shown in FIG. 9 as having a broken line outline. This outline is not necessarily visible in this example, but is instead shown in FIG. 9 only for explanatory purposes so that the reader of the present specification understands the location of white ink stroke 302 within graphical layer 901. Graphical layering is a well-known technique. A set of graphical layers may be considered analogous to a set of stacked transparencies, where the resulting image looks as though the stack of transparencies were viewed at the same time on an overhead projector. Combining graphical layers into a single viewed image is also known as flattening. Thus, each graphical layer may be transparent (except for any non-transparent objects in each layer) so that underlying layers may be visible. When the layers of FIG. 9 are stacked together as shown, then the resulting "flattened" display as displayed to the user is as shown in FIG. 4.

Figure 10:
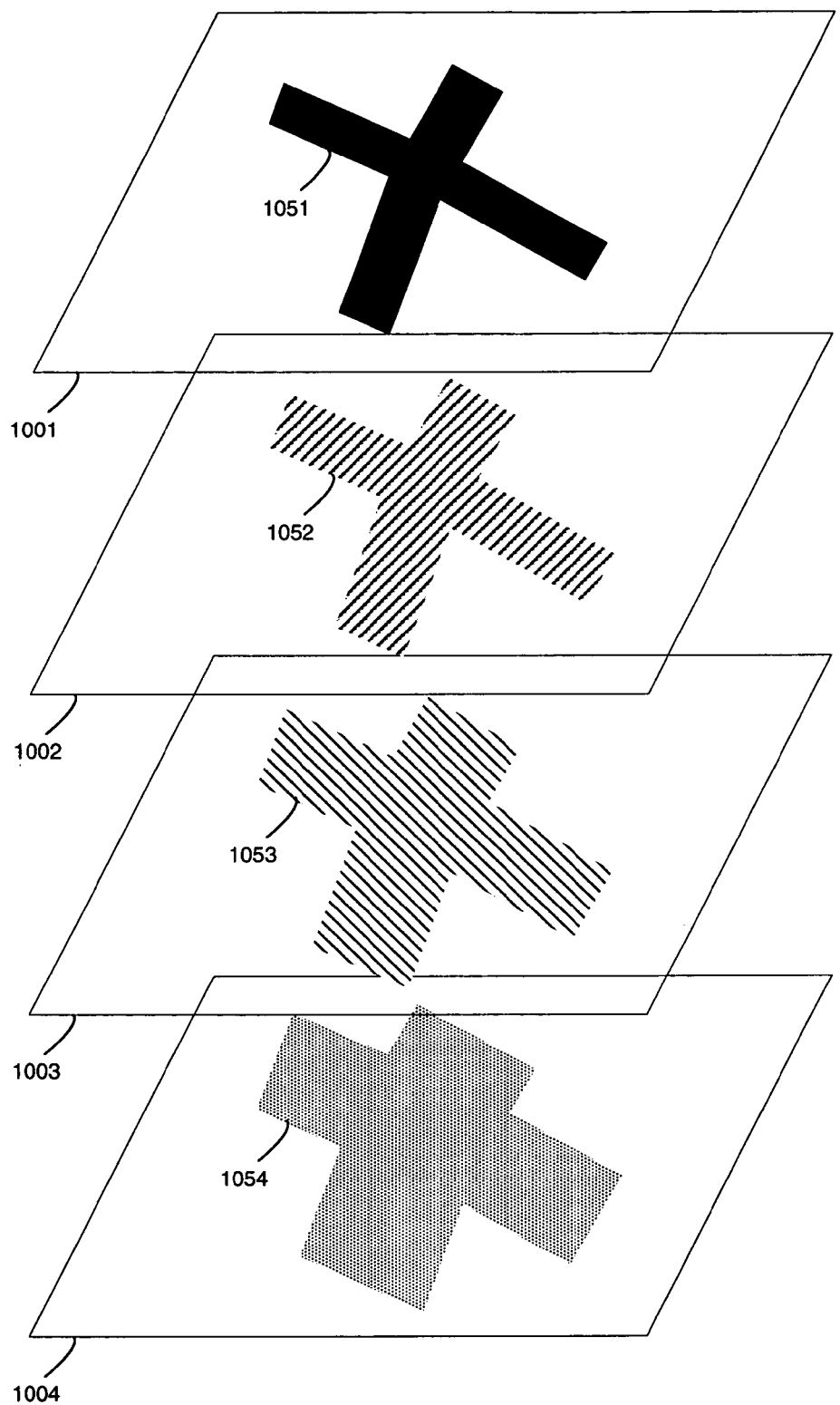
FIG. 10 is another representation of illustrative layering that may be used to display ink and ink outlining, where the ink intersects with itself or with other ink.
Figure 11:
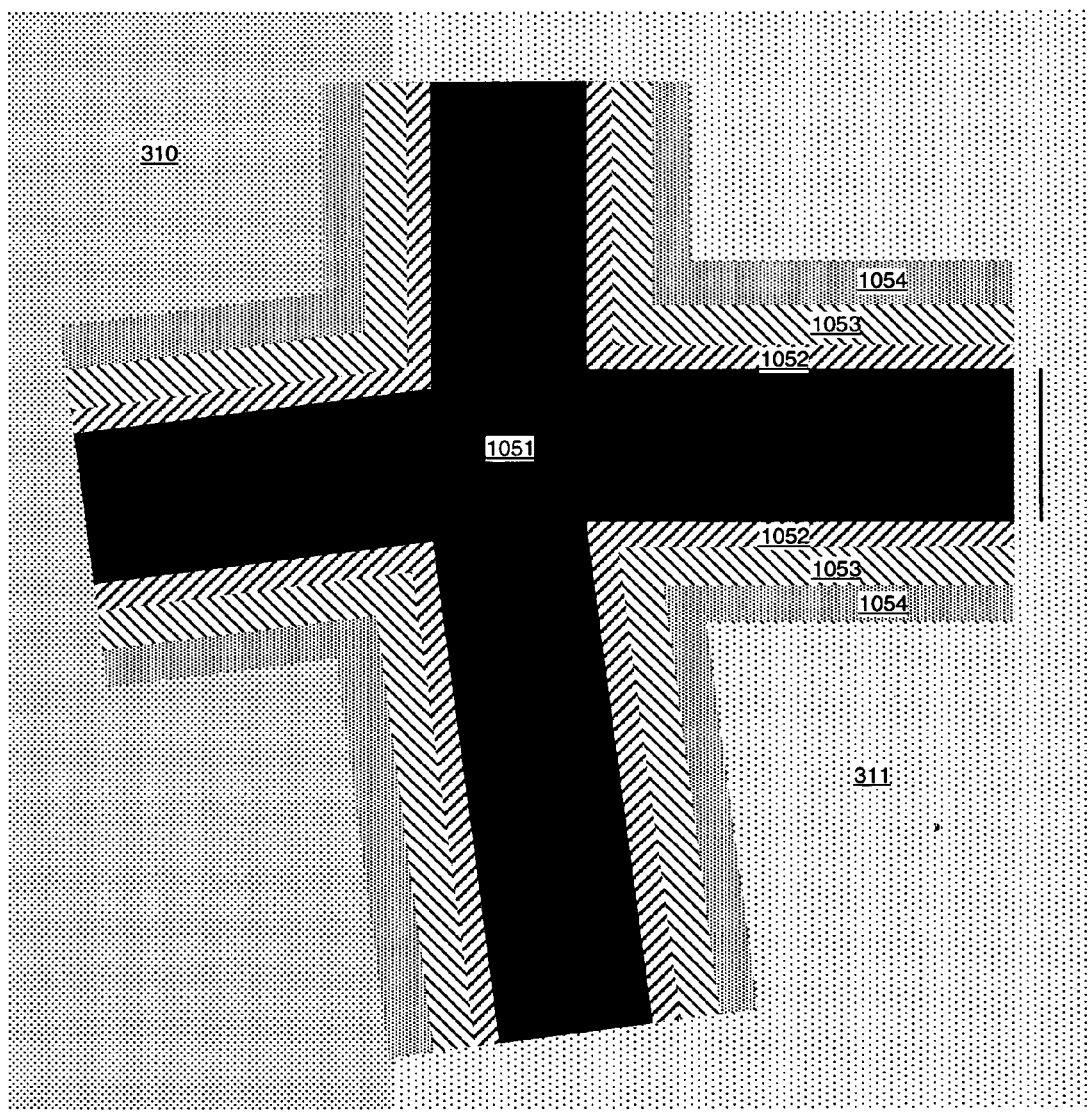
FIG. 11 is an illustrative representation of rendered outlined and overlapping ink strokes.

Intersections of various ink strokes may also be easily handle by using graphical layering. For example FIG. 10 shows an example of ink 1051 having one or more strokes such that ink 1051 intersects with itself. In this case, each stroke or other portion of ink 1051 is outlined with three outlines 1052, 1053, 1054, each successively larger in width. To render using graphical layers, ink 1051 is rendered in a graphical layer 1001, outline 1052 is rendered in a color different from ink 1051 in a graphical layer 1002 below graphical layer 1001, outline 1053 is rendered in a graphical layer 1003 below graphical layer 1002, and outline 1054 is rendered in a graphical layer 1004 below graphical layer 1003. In addition, background 202 is rendered in a graphical layer (not shown) below graphical layer 1004. The cumulative result of this layering, as viewed by the user, is shown in FIG. 11.

Choosing Outline Color and Other Outline Properties

As previously mentioned, the outline color and/or opacity may be automatically chosen based on the ink stroke color. The outline color may alternatively be manually chosen by the user. Where automatically chosen, the outline color may be chosen without regard to the background color(s). In addition, the outline color(s) may be expected to be chosen to be different from the ink stroke color, and may be chosen to be of high contrast in comparison to the ink stroke color. For example, where the ink stroke color is a dark color, at least one of its outlines may be of a light color. Or where the ink stroke color is a light color, at least one of its outlines may be of a dark color. In this way, the ink stroke may be legible on most if not all backgrounds. If the user changes the color of the ink stroke after it is rendered, the outline color may also change. For example, where an ink stroke is black and its outline is white, an action by the user or software to change the already-rendered ink stroke to white may cause the outline to automatically change to black.

The outline color and/or opacity may be chosen in any of a number of ways. For instance, there may be a one-to-one correspondence between each ink stroke color and an associated outline color(s) and/or opacity(ies). The association may be embodied by, for instance, a stored table or database. Or, an outline color may be chosen randomly, for instance, with the limitation that it is not equal to the ink stroke color. The outline color may further be chosen based on other factors in addition to ink stroke color, such as a stored user preference or the thickness or other aspect of the ink stroke to be outlined.

CONCLUSION

Thus, a way of providing more legible ink has been described. By displaying one or more contrasting outlines for written electronic ink, the user may be able to write ink without regard to the background, even for complex backgrounds such as photographs.

What is claimed is:

1. A computer-readable storage medium storing computer-executable instructions adapted to be executed by a processor for implementing a method comprising:
    receiving a user-input ink stroke of a first color;
    rendering the ink stroke in the first color;
    determining a second color based on and different from the first color;
    rendering a first outline of the ink stroke in the second color;
    determining a third color based on the first color and different from the first and second colors; and
    rendering a second outline of the first outline in the third color, wherein the first outline extends beyond the ink stroke by a first width and the second outline extends beyond the first outline by a second width that is larger than the first width.

2. The computer-readable storage medium of claim 1, wherein the ink stroke is rendered as a solid stroke and the first and second outlines are rendered as partially transparent outlines, wherein a first opacity of the first outline is greater than a second opacity of the second outline.

3. The computer-readable storage medium of claim 2, further comprising:
    rendering a third outline of the second outline in a fourth color different from the first, second and third colors,
    wherein the third outline extends beyond the second outline by a third width that is larger than the second width of the second outline and the first width of the first outline,
    wherein the third outline has a third opacity that is less than the second opacity of the second outline for providing a blending with a background on which the ink stroke and the first, second and third outlines are overlaid.

4. The computer-readable storage medium of claim 1, wherein the second and third colors are determined based on the first color by referring to a stored database specifying associations between particular ink stroke colors and corresponding outline colors.

5. The computer-readable storage medium of claim 1, further comprising:
    changing the first color of the ink stroke to a fourth color, different from the first color for rendering the ink stroke in the fourth color;
    determining a fifth color based on and different from the fourth color;
    rendering the first outline of the ink stroke in the fifth color;
    determining a sixth color different from the fourth and fifth second colors; and
    rendering the second outline of the first outline in the sixth color.

6. The computer-readable storage medium of claim 1, wherein a distance that the first outline extends beyond an edge of the rendered ink stroke remains fixed regardless of a width of the rendered ink stroke.

7. A computing system comprising:
    a processor; and
    computer-readable storage media coupled to the processor, the computer-readable storage media containing computer-executable instructions executable by the processor for implementing a program module for;
    receiving a user-input ink stroke of a first color;
    rendering the ink stroke in the first color over a background;
    determining a second color that is based on the first color, that is different from the first color, and that is determined without regard to a coloring of the background;
    rendering an outline of the ink stroke in the second color;
    changing the first color of the ink stroke to a third color, different from the first color, for rendering the ink stroke in the third color;
    determining a fourth color based on and different from the third color of the ink stroke, and that is determined without regard to the coloring of the background; and
    rendering the outline of the ink stroke in the fourth color.

8. The system of claim 7, wherein the ink stroke is rendered as a solid stroke and the outline is rendered as a partially transparent outline.

9. The system of claim 7, wherein rendering the outline includes rendering the outline in a first layer, and wherein rendering the ink stroke includes rendering the ink stroke in a second layer on top of the first layer.

10. The system of claim 7, wherein the outline is a first outline and further comprising:
    prior to the changing the first color, determining a fifth color that is different from the first color and the second color;
    rendering a second outline of the first outline in the fifth color around the first outline and the ink stroke;
    after the changing the first color, determining a sixth color different from the third color and the fourth color; and
    rendering the second outline around the first outline in the sixth color.

11. The system of claim 10, wherein the first outline extends beyond the ink stroke by a first width and the second outline extends beyond the first outline by a second width that is larger than the first width.

12. The system of claim 10, wherein the ink stroke is rendered as a solid stroke and the first and second outlines are rendered as partially transparent outlines, wherein a first opacity of the first outline is greater than a second opacity of the second outline for providing a blending with a background on which the ink stroke and the first and second outlines are overlaid.

13. The system of claim 7, wherein a distance that the outline extends beyond an edge of the rendered ink stroke remains fixed regardless of a width of the rendered ink stroke.

14. The system of claim 7, wherein the second color is determined based on the first color by referring to a stored database specifying associations between particular ink stroke colors and corresponding outline colors.

15. A computer-readable storage medium storing computer-executable instructions for performing steps, the steps comprising:
    receiving a first user selection of a first color;
    receiving ink;
    displaying the ink in the first color over a background;
    determining a second color that is based on the first color, that is different from the first color, and that is determined without regard to a coloring of the background;
    displaying a region in the second color, wherein the region surrounds and is immediately adjacent to the ink, wherein the portion of the display extends from the ink a distance no further than a width of the ink;

receiving a second user selection, after the step of displaying the region, to change the color of the ink from the first color to a third color;

responsive to the second user selection, displaying the ink in the third color, determining a fourth color that is based on the third color, that is different from the third color, and that is determined without regard to the coloring of the background; and displaying the region in the fourth color.

16. The computer-readable storage medium of claim 15, wherein the region is a first region and further comprising:

prior to receiving the second user selection, determining a fifth color that is different from the first color and the second color;

displaying a second region in the fifth color, wherein the second region surrounds and is immediately adjacent to the first region, wherein the displayed second region extends from the first region a distance no further than the width of the ink;

after receiving the second user selection, determining a sixth color different from the third color and the fourth color; and displaying the second region in the sixth color.

17. The computer-readable storage medium of claim 16, wherein the first region extends beyond the ink by a first width and the second region extends beyond the first region by a second width that is larger than the first width.

18. The computer-readable storage medium of claim 16, wherein the ink is displayed as being opaque and the first and second regions are displayed as partially transparent over top of a background, wherein a first opacity of the first region is greater than a second opacity of the second region for providing a blending with the background.

19. The computer-readable storage medium of claim 18, wherein the second color is determined based on the first color by referring to a stored database specifying associations between particular ink colors and corresponding region colors.

20. The computer-readable storage medium of claim 15, wherein a distance that the region extends beyond an edge of the displayed ink remains fixed regardless of the width of the ink.

* * * * *

UNITED STATES PATENT AND TRADEMARK OFFICE
CERTIFICATE OF CORRECTION

| | | |
|---|---|---|
| PATENT NO. | : 7,605,947 B2 | Page 1 of 1 |
| APPLICATION NO. | : 11/362712 | |
| DATED | : October 20, 2009 | |
| INVENTOR(S) | : Colin R. Anthony et al. | |

It is certified that error appears in the above-identified patent and that said Letters Patent is hereby corrected as shown below:

In column 10, line 2, in Claim 7, delete "for;" and insert -- for: --, therefor.

Signed and Sealed this
Fifteenth Day of February, 2011

David J. Kappos
*Director of the United States Patent and Trademark Office*